United States Patent [19]

Claude et al.

[11] 4,398,644

[45] Aug. 16, 1983

[54] TWO-LAYER CLOSURE, PARTICULARLY FOR CLOSING PLASTIC CONTAINERS

[75] Inventors: Bruno Claude, Montivilliers; Daniel Pellerin; Jean-Jacques Labaig, both of Le Havre, all of France

[73] Assignee: Compagnie Francaise de Raffinage, Paris, France

[21] Appl. No.: 309,159

[22] Filed: Oct. 7, 1981

Related U.S. Application Data

[63] Continuation of Ser. No. 97,186, Nov. 26, 1979, abandoned.

[30] Foreign Application Priority Data

Nov. 24, 1978 [FR] France ............................... 78 33243

[51] Int. Cl.³ .......................................... B65D 53/00
[52] U.S. Cl. .................................... 215/232; 428/461; 428/355; 428/344; 220/359; 220/258
[58] Field of Search ................ 428/461, 355, 344, 35; 215/232; 425/809; 220/359, 258

[56] References Cited

U.S. PATENT DOCUMENTS 4,131,211 12/1978 Corbic ................................. 215/232

FOREIGN PATENT DOCUMENTS 295627 7/1965 Australia ............................... 525/78
964977 8/1964 United Kingdom .

Primary Examiner—George F. Lesmes
Assistant Examiner—E. R. Buffalow

[57] ABSTRACT

The invention relates to a two-layer composite material comprising a metal foil and an adhesive layer.

The adhesive layer is formed of a mixture of two compounds A and B, compound A being a copolymer of an aliphatic monoolefin and a monoethylenically unsaturated carboxylic acid which has good adhesion for the metal foil and the container, and compound B being a compound adapted to reduce the adhesion of compound A for the metal foil and/or the container.

Said composite material is intended in particular for the fabrication of caps serving as closures for containers.

10 Claims, No Drawings

TWO-LAYER CLOSURE, PARTICULARLY FOR CLOSING PLASTIC CONTAINERS

This is a continuation, of application Ser. No. 97,186, filed Nov. 26, 1979 now abandoned.

The present invention relates to two-layer composite materials intended particularly for the fabrication of caps serving as closures for plastic containers such as bottles.

It is known to use caps, whether round or of any other shape, as closures for hollow bodies made of plastic, for example, or for any other containers, which caps are cut from multilayered sheets and provide a tight seal for such containers. The materials generally used to form such sealing caps are polyethylene, polypropylene, vinyl polychloride or polystyrene, and sealing of the containers by means of the cap is accomplished by joining the multilayer composition material to the container by heat-sealing.

The multilayer sheets used generally comprise a thin aluminum foil, an adhesive layer, and a plastic film.

By the use of caps made from such multilayer composite materials and heat-sealed to the containers under appropriate conditions, a tight closure, essential to satisfactory preservation of the product packaged in the container, is obtained.

This type of multilayer sheet is well suited for the purpose, provided that the package so closed is not subsequently subjected to a heat treatment necessary for the preservation of the product, as, for example, high temperature sterilization in the case of milk.

However, the need for a tight closure entails a number of drawbacks with respect to the closure.

In particular, opening of the container at the time of its first use is not very convenient since a pointed instrument or a cutting implement must be used to puncture the cap. If no such instrument is handy, it may be possible to puncture the cap with a finger or fingernail; but when the packaged product must be kept sterile as long as possible, this approach is not recommended.

Moreover, once opened, such containers cannot be closed and reopened after the first use except with some other closing means. Thus, even if the product is kept in a refrigerator, it is protected neither from odors nor against contamination unless a closure other than the cap is used.

The present invention seeks to overcome these drawbacks by proposing a multilayer composite material which, apart from the tightness provided by its being heat-sealed onto the mouth of the container, offers the advantage of being capable of being peelable, that is to say, of being readily pulled by hand from the surface of the mouth during the first use of the container.

For this purpose, a preferred embodiment of the invention is a two-layer composite material intended particularly for the fabrication of caps serving as closures for containers which comprises a metal foil and an adhesive layer formed by a mixture of two compounds, A and B.

Compound A is a compound having very good adhesion for the metal foil and the container to which the composite material is to be sealed.

Compound B is a compound which reduces the adhesion of compound A for the metal foil and/or the container and permits the composite material to be peeled off.

In accordance with the invention, compound A is a copolymer of an aliphatic monoolefin and of a monoethylenically unsaturated carboxylic acid.

Said copolymer may be obtained particularly by polymerization of ethylene or propylene followed by grafting of a small amount, generally less than 5 weight percent, of a monoethylenically unsaturated carboxylic acid such as acrylic acid or methacrylic acid.

When the olefin is ethylene, compound A is preferably high-density polyethylene grafted with less than 5 weight percent acrylic acid.

Compound B is chosen on the basis of the nature of compound A and of the material of the container to which the composite material is to be sealed.

When compound A is a copolymer of ethylene and acrylic acid and the composite material is to be used to close a polyethylene container, compound B may be selected in particular from the group consisting of
  low-density polyethylene,
  high-density polyethylene,
  polyisobutylene,
  polystyrene, and
  mixtures of saturated hydrocarbons obtained in the refining of crude petroleum and known by the names of "paraffin" or "wax".

"Paraffin" is a blend of saturated hydrocarbons which has a crystalline structure and whose melting temperature ranges from 35° to 66° C. Most of the paraffin is formed of linear saturated aliphatic hydrocarbons. Its oil content generally is under 5 weight percent and preferably is under 1 weight percent.

The "wax" is a blend of saturated hydrocarbons whose molecular weights are higher than that of paraffin. A wax has more cyclic and branched molecules and a higher oil content than paraffin. Wax is amorphous, and its melting temperature ranges from 66° to 100° C.

When compound A is a copolymer of propylene and acrylic acid and the composite material is to be used to close a polypropylene container, compound B may be selected in particular from the group consisting of
  copolymers of ethylene and propylene, and
  the copolymer of ethylene and acrylic acid used as compound A when the container is made of polyethylene.

The composition of the adhesive layer is chosen on the basis of the nature of compounds A and B and with due regard to the intended use of the two-layer composite materials. It should contain enough of compound A to be adhesive, and enough of compound B for the composite material to be capable of being ripped off.

As a general rule, the adhesive layer may contain from 10 to 90 weight percent of compound A and from 90 to 10 weight percent of compound B.

Examples for the composition of the adhesive layers are given in Table 1 which follows.

TABLE 1

| Composite material No. | Compound A Nature | Wt. % | Compound B Nature | Wt. % | Material of container to which composite material is sealed |
|---|---|---|---|---|---|
| 1 | Copolymer of | 75 to 25 | Low-density | 25 to 75 | High-density. |

TABLE 1-continued

| Composite material No. | Compound A Nature | Wt. % | Compound B Nature | Wt. % | Material of container to which composite material is sealed |
| --- | --- | --- | --- | --- | --- |
| | ethylene and acrylic acid | | polyethylene | | polyethylene |
| 2 | As above | 90 to 60 | Polyisobutylene | 10 to 40 | As above |
| 3 | As above | 80 to 20 | Paraffin | 20 to 80 | As above |
| 4 | As above | 75 to 25 | Polystyrene | 25 to 75 | As above |
| 5 | As above | 80 to 40 | High-density polyethylene | 20 to 60 | As above |
| 6 | Copolymer of propylene and acrylic acid | 80 to 10 | Copolymer of ethylene and acrylic acid | 20 to 90 | Polypropylene |
| 7 | As above | 80 to 20 | Ethylene-propylene copolymer | 20 to 80 | As above |

The adhesive layer has a thickness of preferably less than 20 microns, and the thickness of the metal foil, which may be aluminum foil, for example, is preferably between 30 and 80 microns.

The two-layer composition materials in accordance with the invention are preferably prepared by a particular process comprising the following steps:

(a) Preparation of a suspension of compound A in an organic liquid, said suspension containing compound B in suspension or solution;

(b) coating of the metal foil with the suspension of compound A which contains compound B in suspension or solution;

(c) elimination of the organic liquid; and (d) melting of the compounds so as to obtain a continuous layer of compounds on the metal foil.

The suspension of compound A containing compound B may be obtained by dissolving compounds A and B in an organic liquid and then cooling the resulting solution, such cooling being preferably rapid.

Compound B may be soluble at ambient temperature in the organic liquid. In that case, it may be added to the suspension of compound A prepared in the manner outlined above.

Coating of the metal foil may be effected by means which are known in the art, for example, with a transfer roller.

The organic liquid contained in the suspension must then be eliminated from the coated metal foil by drying of the substrate, for example, by heating it in a tunnel dryer.

The metal sheet is then brought to a sufficiently high temperature for the compounds to melt. When the adhesive layer is composed of polyethylene and graft polyethylene, that temperature will be in the neighborhood of 150° C. Melting of the layer of compounds may be accomplished by passing the metal foil over a cylinder that has been heated to an appropriate temperature.

The composite materials in accordance with the invention may be used to fabricate caps serving as closures for containers. The composite materials may be joined to the containers by a heat-sealing operation.

Heat-sealing consists of holding the composite material against the container for a very short time (a few seconds) at a temperature that will depend on the nature of the composite material and of the container. The temperature should be sufficiently high for the composition material to adhere well to the container, but should not be too high, so that the composite material would be peelable. If the temperature is excessively high, it will no longer be possible to peel off the composite material.

For a polyethylene container, the heat-sealing temperature may range from 160° to 210° C.

For a polypropylene container, the heat-sealing temperature may be between 170° and 250° C.

When composite materials in accordance with the invention are used as closures for containers, a small tongue may advantageously be provided on the cap to facilitate its being pulled off.

Moreover, the cap may be ripped off only partly so that it remains united to the container. After use, the container may then be reclosed with the cap.

The two-layer composite materials in accordance with the invention are generally suited for the closing of containers of any shape, such as boat-shaped containers, bottles, etc. They lend themselves well to the forming of caps serving as closures for bottles which contain liquid products such as sterilized milk, fruit juices, etc.

Some composite materials are especially well suited for use as closures for containers in which products such as custards or yogurts are packaged while hot. Such products may be packaged in polypropylene boats at a temperature ranging from 40° to 100° C. When plastic composite materials are used to close such containers, these composites will adhere poorly, because of the temperature to which they are brought as the products are introduced at a temperature ranging from 40° to 100° C., unless the precaution is taken to first lower the temperature of the containers. The use of the special composite materials falling within the scope of the invention makes it possible to obtain polypropylene containers holding custards or yogurts which are tight even at the packaging temperatures indicated above. This means that the packaging time may be reduced.

The examples which follow will serve to illustrate the invention without limiting it.

EXAMPLE 1

This example illustrates the preparation of two-layer composite materials in accordance with the invention.

A solution containing compound A and, optionally, compound B is prepared by dissolving compound A, and optionally compound B, while hot in a solvent at 140° C.

The solution is then rapidly cooled to below 50° C.

A suspension of compound A and, optionally, of compound B is thus obtained.

When compound B is not dissolved in the hot solvent at the same time as compound A, compound B is dissolved in the suspension of compound A.

Aluminum foil is then coated with the suspension so obtained by means of a transfer roller. The coated aluminum foil is then passed through a tunnel dryer at 120° C. for elimination of the solvent, then over a cylinder heated to 240° C. for the purpose of melting compounds A and B.

Eight composite materials were prepared in this manner. The conditions of their preparation and their characteristics are set forth in Table 2 which follows.

TABLE 2

| Composite material No. | Composition of suspension used | | | | | Final cooling temperature of solution, °C. | Thickness of adhesive layer, microns | Thickness of aluminum foil, microns |
|---|---|---|---|---|---|---|---|---|
| | Nature of components | | | Concentration of compounds A and B combined, wt. % | Ratio between compounds A and B, % | | | |
| | Compound A | Compound B | Solvent | | A | B | | | |
| 11 | GHDP[(1)] | LDPE[(2)] | n-Heptane | 7 | 50 | 50 | 30 | 4 | 65 |
| 12 | GHDP[(1)] | LDPE[(2)] | n-Heptane | 6 | 30 | 70 | 30 | 5 | 50 |
| 21 | GHDP[(1)] | PIB[(3)] | n-Heptane | 6 | 80 | 20 | 30 | 2 | 50 |
| 31 | GHDP[(1)] | PAR[(4)] 56-58 | n-Heptane | 14 | 50 | 50 | 30 | 4 | 50 |
| 41 | GHDP[(1)] | PS[(5)] | Cyclohexane | 2.5 | 50 | 50 | 40 | 2 | 50 |
| 51 | GHDP[(1)] | HDPE[(6)] | n-Heptane | 6 | 50 | 50 | 30 | 3 | 50 |
| 61 | GPP[(7)] | GHDP[(1)] | n-Heptane | 7 | 70 | 30 | 30 | 4 | 50 |
| 71 | GPP[(7)] | EP[(8)] | n-Heptane | 7 | 70 | 30 | 30 | 4 | 50 |

NOTE:
In tests 21 and 31, polyisobutylene and paraffin, respectively, were added to the suspension of grafted high-density polyethylene.
Legend for Table 2:
[(1)]GHDP = High-density polyethylene (d = 0.960) grafted with 1 wt. % acrylic acid
[(2)]LDPE = Low-density polyethylene (d = 0.918)
[(3)]PIB = Polyisobutylene of density 0.916
[(4)]PAR 56-58 = Paraffin of a density of 0.895 and a melting point of 57° C.
[(5)]PS = Polystyrene of density 1.11
[(6)]HDPE = High-density polyethylene (d = 0.960)
[(7)]GPP = Polypropylene (d = 0.910) grafted with 1 wt. % acrylic acid
[(8)]EP = Ethylene-propylene copolymer of density 0.88

EXAMPLE 2

This example relates to tightness and rip tests performed on containers closed with the composite materials prepared in Example 1.

A bottle made of high-density polyethylene (d=0.960) or of polypropylene was filled with water and then hermetically sealed with the composite material, which was heat-sealed onto its mouth. The latter was round, its diameter being 44 mm and its thickness 2.5 mm.

A polyethylene bottle was used for the composite materials 11, 12, 21, 31, 41 and 51 while a polypropylene bottle was used for composite materials 61 and 71.

Sealing was effected by applying the composite material to the mouth of the bottle by means of a heating plate for 2 seconds and with such pressure that the bottle was compressed by 2 mm.

The heating plate was brought to 200° C. for composite materials 11, 12, 21, 31, 41 and 51 and to 220° C. for composite materials 61 and 71.

(A) TIGHTNESS TESTS

The bottle was laid on the floor and tested for tightness at the level of the cap by loading it with the weight of a person.

The bottles sealed with the composite materials in accordance with the invention were found to be tight.

(B) RIP TESTS

Two types of tests were run, namely, qualitative tests and quantitative tests.

1. Qualitative tests

The sealed bottles used in the tightness tests were subjected to tests in which it was sought to rip off the caps formed from the composite materials by hand with the aid of a small tongue with which they had been provided. It was found that the composite materials could readily be ripped off.

2. Quantitative tests

The effort required to rip off the sealed cap was measured on an INSTRON pulling-test apparatus for plastics which had been fitted with a special fixture for holding the bottle firmly by its neck in a movable lower jaw, a stationary upper jaw maintaining the cap in position by its tongue. The pulling effort was exerted in a plane substantially perpendicular to the plane in which the cap had been heat-sealed to the mouth.

In this way the caps were ripped from the surface of the bottle mouths cleanly, without tears, and completely. The pull was exerted at a constant velocity of 500 mm/min.

The results of these tests are presented in Table 3 which follows and which gives the pull required for each composite material.

TABLE 3

| Composite material No. | Pulling force in daN |
|---|---|
| 11 | 1 |
| 12 | 0.8 |
| 21 | 0.7 |
| 31 | 1 |
| 41 | 0.8 |
| 51 | 1 |
| 61 | 0.7 |
| 71 | 0.7 |

These tests show that the composite materials in accordance with the invention are capable of being ripped off while remaining tight. A pulling force ranging from 0.6 to 1.25 daN, depending on the test used, may be regarded as satisfactory.

What is claimed is:

1. An article of manufacture comprising a container formed of polyethylene or polypropylene having an opening therein, a metal-foil closure heat-sealed to said container across said opening, said closure comprising a metal foil, an adhesive layer bonded to one side of said foil, said adhesive layer being formed of a mixture of two compounds A and B, compound A being a copolymer of an aliphatic monoolefin and of a monoethylenically unsaturated carboxylic acid capable of having good heat-sealed adhesion to the metal foil and to the container, and compound B being a compound which reduces said adhesion of compound A for the container sufficiently that a viable capping seal was formed by heat sealing and yet closure is conveniently peelable from said container.

2. An article according to claim 1, wherein said container is polyethylene and said compound A is a graft copolymer prepared by polymerization of ethylene followed by grafting of acrylic acid.

3. An article according to claim 2, wherein compound A is high-density polyethylene grafted with less than five weight percent acrylic acid.

4. An article according to claim 3, wherein compound B is selected from the group consisting of
low-density polyethylene,
high-density polyethylene,
polyisobutylene,
polystyrene,
paraffin, and
wax.

5. An article according to claim 4, wherein said metal foil is aluminum of a thickness from 30 to 80 microns; said adhesive layer is less than 20 microns thick and contains from 10 to 90 wt. % of compound A and from 90 to 10 wt. % of compound B.

6. An article according to claim 1, wherein said container is polypropylene and said compound A is a graft copolymer prepared by polymerization of propylene followed by grafting of acrylic acid.

7. An article according to claim 6, wherein compound B is selected from the group consisting of
copolymers of ethylene and propylene, and
copolymers prepared by polymerization of ethylene followed by grafting of acrylic acid.

8. An article according to claim 7, wherein said metal foil is aluminum of a thickness from 30 to 80 microns, said adhesive layer is less than 20 microns thick and contains from 10 to 90 wt. % of compound A and from 90 to 10 wt. % of compound B.

9. An article according to one of claims 1, 2, or 3, wherein compound B is selected from the group consisting of polyisobutylene, polystyrene, paraffin, and wax.

10. An article according to claims 5 or 8, wherein said mixture of compounds A and B is such that the heat seal closure on said container is peelable with a pulling force of 0.6 to 1.25 daN perpendicularly-applied at a constant velocity of 500 mm/min.

* * * * *